3,810,748
GLASS PROCESSING LATHE

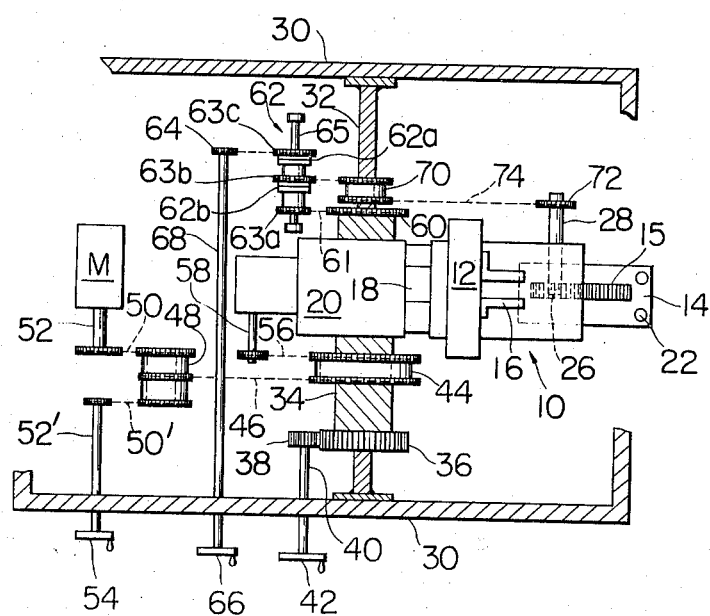

Kunihiro Matuzawa, Mito, Kikuo Kimura and Ryo Sato, Ibaragi-ken, and Shigeji Nakajima and Yuichi Ikeda, Hitachi, Japan, assignors to Japan Atomic Energy Research Institute, Tokyo, and Nakajima Industry Company Limited, Ibaragi-ken, Japan
Filed Oct. 12, 1972, Ser. No. 296,896
Claims priority, application Japan, Dec. 17, 1971, 46/101,868; Dec. 29, 1971, 47/4,677
Int. Cl. C03b 23/00
U.S. Cl. 65—271
8 Claims

ABSTRACT OF THE DISCLOSURE

A lathe for mechanical processing of massive glass articles including a lathe spindle and a base for supporting a burner means are mounted on an oscillating block rotatable about a substantially horizontal axis whereby the spindle may be rotated about a substantial angular range, and a power transmission means disposed concentrically with the horizontal axis.

---

This invention relates to a glass processing lathe for mechanically manufacturing glass instruments, articles, wares and the like.

In general, most glassware has heretofore been obtained through manual processing of glass. However, such handcrafting of glass faces critical problems in producing the massive glass articles commercially desired these days which must be machined to the degree of accuracy required in metal work.

The conventional art by which glass is manually processed is not well suited for the production of massive glassware.

Some horizontal or vertical lathes in which a spindle is mounted at a fixed angle have been proposed to mechanically process glass but limited to some extent. A lathe of this class is substantially the same as the conventional metal working lathe except for provision of a head spindle chuck for holding a glass tube or rod, a chuck rotatable at a regulated speed, and a glass heating burner in place of a metal cutting bit.

A disadvantage of this construction is that the lathe is limited to partial processing of glass and does not rely sufficiently on the properties of glass. More specifically, when glass is heated its viscosity is reduced and if melted it has a high flow rate. However, the conventional lathe is not adapted to take advantage of these properties since the spindle is angularly fixed.

It is, therefore, a primary object of the invention to provide a novel glass processing lathe which overcomes the defects involved in the conventional lathe. To this end, this glass processing lathe is provided with an angularly movable spindle to make efficient use of the plastic flow of glass due to heat.

The present invention is characterized in that a lathe spindle and a burner mounting base are mounted on an oscillating block rotatable about a substatially horizontal axis to allow the spindle to be rotatable within a wider angular range, and that a power transmission mechanism for these members is disposed to be concentric with the horizontal axis.

For a fuller understanding of the objects and features of the invention, reference should be made to the following detailed description taken in conjunction with the accompanying drawing.

The drawing is a schematic plan view showing a glass processing lathe according to the present invention partially broken away.

As shown, an oscillating block generally indicated as 10 includes a casing 20 integrally formed therewith, and a burner mounting base 14 slidably mounted on the block 10. A chuck spindle 18 extends through casing 20 and carries at its forward end a chuck 12 having adjustable chuck elements 16 adapted to hold glass in a tubular or rod form. The burner mounting base 14 is mounted forwardly (at the right of drawing) and downwardly of the block 10 to be telescoped with respect thereto thereby adjusting the distance between a burner 22 and a glass to be processed while being held by the chuck elements 16. Inward or outward slide movement of the burner mounting base 14 in relation to the block 10 is accompanied by a selective rotation of a base slide shaft 28 having a pinion 26 in engagement with a rack 15 formed at the base 14.

In this manner, the oscillating block 10 which includes the chuck 12 and the burner mounting base 14 rotatable or slidable through a mechanism as will be explained later, is adapted to be angularly rotated. More specifically, the oscillating block 10 is supported by an oscillating shaft 34 rotatably and concentrically disposed on an axis of a shaft 32 fixed to a main body casing 30.

The oscillating shaft 34 is rotated by operating a manual handle 42 through a gear 36 mounted on the shaft 34 at one end thereof, a gear 38 engageable with the gear 36, and a gear shaft 40.

A compound chain sprocket 44 is mounted on the oscillating shaft 34 and coupled through a chain 46, a clutch wheel 48, a chain 50 (or 50'), and a drive shaft 52 (or 52') to a motor M (or a manual handle 54) on one hand, and connected through a chain 56, and a sprocket shaft 58 to a chuck spindle 18 in the casing 20 on the other hand. With this arrangement, drive power from the motor M or the manual handle 54 as a power source is imparted through a chain sprocket 44 on the oscillating shaft 34 to the chuck spindle.

The oscillating shaft 34 is provided at the other end thereof with a chain sprocket 60 which is connected by a chain 61 to a sprocket 63a of a clutch wheel 62. The clutch wheel 62 includes sprockets 63b and 63c as well as the sprocket 63a concentrically mounted on a shaft 65 secured in relation to the casing 30. The sprockets 63b and 63c are connected by clutches 62c and 62b. The sprocket 63c for the clutch 62 is coupled by a chain to a shaft 68. The shaft 68 has a sprocket 64 at its one end and a manual handle 66 at its other end. A sprocket 70 is concentrically mounted on the shaft 32. The sprocket 70 is coupled on one hand by a chain 74 to a sprocket 72 on a slide shaft 28 and on the other hand by a chain to a sprocket 63b on the clutch wheel 62. With this arrangement, transmission of rotational force from the manual handle 66 to the slide shaft 28 is effected in the following manner.

Clockwise or counterclockwise rotation of the manual handle 66 is imparted through the sprocket 64 and the chain to the sprocket 63c, at which time, the clutch 62a is "on" or, into engagement whereas the clutch 62b is placed out of engagement "off." As a result, the sprocket 63b is rotated to make the sprocket 63a immovable. In this manner, rotation of the sprocket 63b is transmitted by the chain to a sprocket 70. This enables the pinion 26 to rotate via a chain 74 and sprocket 72 thereby sliding the burner mounting base 14.

Customarily, where the oscillating block 10 is rotated counterclockwise from a position as shown to a vertical position, the chain 74 is intended to rotate the sprocket 70 as the block is rotated. In this instance, if the sprocket 70 is not well rotated, the chain 74 is subjected to an objectional tension and this results in damage thereto. In order to avoid such trouble, the chain 74 is required to facilitate smooth rotation of the sprocket. To this end, it is necessary to forceably rotate the sprocket. According to the embodiment as shown, rotation of the oscillating shaft 34 is imparted by the sprocket 60, the chain 61 thereon and by the sprockets 63a and 63b on the clutch wheel 62 to the sprocket 70 in a synchronous manner. During rotation of the oscillating block 10, rotation of the oscillating shaft 34 is transmitted to only the sprocket 70 but not to the manual handle 66 through the sprocket 63c if the clutch 62b is in "on" condition while the clutch 62a is in "off" condition.

With reference to the clutches 62a and 62b, the foregoing may be summarized in the following way.

When the burner mounting base 14 is moved forward, the clutch 62a is in "on" condition while the clutch 62b is in "off" condition. On the other hand, when the oscillating block is rotated, the clutch 62 is in "off" condition whereas the clutch 62b is in "on" condition. In other words, forward movement of the burner mounting base and rotation of the oscillating block is not effected without changeover of these clutches.

According to the present invention, it is not necessary to provide a motor for rotating the chuck spindle on the oscillating block. On the contrary, this motor can be provided away from the oscillating block in the main body casing. The result is that the oscillating block is lightened as the whole and load applied to the oscillating shaft is reduced thereby facilitating oscillation throughout vertical to diagonal range, that is, angular range of about 125°.

What is claimed is:

1. A glass processing lathe, comprising:
   a casing;
   a shaft mounted within said casing;
   an oscillating block pivotally mounted on said shaft for rotation with respect to said casing about the axis of said shaft;
   a chuck spindle rotatably mounted on said block, the axis of said spindle extending in a direction transverse to the direction of the axis of said shaft;
   a burner mounting base slidably mounted on said block for sliding movement in directions parallel to the direction of the axis of said spindle.

2. The lathe of claim 1, additionally comprising a chuck attached to said spindle, and a burner mounted on said base for sliding movement of said burner toward and away from said chuck in directions parallel to the direction of the axis of said spindle.

3. The lathe of claim 1, additionally comprising means for rotating said spindle with respect to said block, and means for rotating said block with respect to said casing.

4. The lathe of claim 3, additionally comprising means for moving said base in directions parallel to the direction of the axis of said spindle.

5. The lathe of claim 4, wherein said means for rotating said spindle and means for moving said base includes a power source located separate from said block.

6. The lathe of claim 4, wherein said means for rotating said spindle and for moving said base includes sprocket wheels pivotally mounted for rotation about said shaft.

7. The lathe of claim 6 wherein said means for moving said base includes a rack gear on said base and a pinion gear engaged with said rack gear, said pinion gear being mounted on a second shaft which also has a sprocket drive wheel attached thereto, and means linking said sprocket drive wheel with one of said sprocket wheels mounted for rotation about said shaft.

8. The lathe of claim 7 additionally comprising: a synchronizing sprocket connected to said block and rotatable with said block about the axis of said shaft; clutching means; means linking said clutching means and said synchronizing sprocket; and means linking said clutching means and said one of said sprocket wheels; for preventing rotation of said block about the axis of said shaft from displacing said burner mounting base with respect to the block.

References Cited
UNITED STATES PATENTS

| | | | |
|---|---|---|---|
| 2,983,078 | 5/1961 | Mistler et al. | 65—110 |
| 3,186,819 | 6/1965 | Thorington et al. | 65—109 X |
| 2,521,352 | 9/1950 | Dockerty et al. | 65—176 X |
| 3,309,188 | 3/1967 | Porter et al. | 65—109 |
| 3,503,435 | 3/1970 | Dunlop | 425—175 |

FRANK W. MIGA, Primary Examiner

U.S. Cl. X.R.
65—109, 272, 279